US008202361B2

(12) United States Patent
Fechner et al.

(10) Patent No.: US 8,202,361 B2
(45) Date of Patent: Jun. 19, 2012

(54) AQUEOUS PIGMENT PREPARATIONS COMPRISING ANIONIC ADDITIVES BASED ON ALLYL ETHER AND VINYL ETHER

(75) Inventors: Bjoern Fechner, Eppstein (DE); Carsten Schaefer, Muehldorf am Inn (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 12 days.

(21) Appl. No.: 12/674,137

(22) PCT Filed: Jul. 23, 2008

(86) PCT No.: PCT/EP2008/006020
§ 371 (c)(1),
(2), (4) Date: Feb. 18, 2010

(87) PCT Pub. No.: WO2009/024232
PCT Pub. Date: Feb. 26, 2009

(65) Prior Publication Data
US 2011/0107803 A1   May 12, 2011

(30) Foreign Application Priority Data
Aug. 23, 2007   (DE) .......................... 10 2007 039 783

(51) Int. Cl.
C09B 67/00 (2006.01)
C09B 67/20 (2006.01)
C09D 17/00 (2006.01)

(52) U.S. Cl. .................. 106/493; 106/15.05; 106/31.58; 106/31.6; 106/31.75; 106/34; 106/272; 106/413; 106/494; 106/495; 106/496; 106/497; 106/498; 106/499; 430/7; 430/108.1; 524/81

(58) Field of Classification Search .................. 106/413, 106/476, 493, 494, 495, 496, 497, 498, 499, 106/15.05, 31.58, 31.6, 31.75, 34, 272, 712; 430/7, 108.1; 524/81
See application file for complete search history.

(56) References Cited

U.S. PATENT DOCUMENTS

| 4,293,475 | A | * | 10/1981 | Sidi | 523/410 |
|---|---|---|---|---|---|
| 5,436,292 | A | | 7/1995 | Jenkins | |
| 6,582,510 | B1 | * | 6/2003 | Schwartz | 106/499 |
| 7,834,098 | B2 | | 11/2010 | Wenning et al. | |
| 7,905,955 | B2 | | 3/2011 | Fechner et al. | |
| 7,938,900 | B2 | | 5/2011 | Fechner et al. | |
| 2002/0019459 | A1 | * | 2/2002 | Albrecht et al. | 523/161 |
| 2003/0144399 | A1 | * | 7/2003 | Matta et al. | 524/419 |
| 2003/0209695 | A1 | | 11/2003 | Tsuzuki | |
| 2006/0247347 | A1 | | 11/2006 | Glos et al. | |
| 2008/0255316 | A1 | | 10/2008 | Wenning et al. | |
| 2009/0007820 | A1 | * | 1/2009 | Itoh et al. | 106/400 |
| 2009/0221739 | A1 | * | 9/2009 | Knischka et al. | 524/505 |
| 2010/0116010 | A1 | | 5/2010 | Fechner et al. | |
| 2010/0137536 | A1 | | 6/2010 | Fechner et al. | |
| 2010/0137537 | A1 | | 6/2010 | Fechner et al. | |
| 2011/0065879 | A1 | | 3/2011 | Fechner et al. | |
| 2011/0107803 | A1 | | 5/2011 | Fechner et al. | |
| 2011/0185781 | A1 | | 8/2011 | Fechner et al. | |
| 2011/0213094 | A1 | | 9/2011 | Fechner et al. | |
| 2011/0244385 | A1 | | 10/2011 | Fechner et al. | |

FOREIGN PATENT DOCUMENTS

| DE | 102005012315 | | 9/2006 |
|---|---|---|---|
| DE | 102007021867 A1 | * | 11/2008 |
| DE | 102007021870 | | 11/2008 |
| EP | 1142972 A2 | * | 10/2001 |
| EP | 1293523 | | 3/2003 |
| EP | 1371685 A2 | * | 12/2003 |
| EP | 1721941 | | 11/2006 |
| WO | WO02/051948 A2 | * | 7/2002 |
| WO | WO03/037984 A1 | * | 5/2003 |
| WO | WO2006/074969 A1 | * | 7/2006 |
| WO | WO2006/098261 A1 | * | 9/2006 |

OTHER PUBLICATIONS

PCT Search Report for PCT/EP 2008/006020, Jan. 20, 2009.
English Translation of the PCT International Report on Patentability for PCT/EP 2008/006020, Mar. 11, 2010.

* cited by examiner

Primary Examiner — Anthony J Green
(74) Attorney, Agent, or Firm — Anthony A. Bisulca

(57) ABSTRACT

The invention relates to an aqueous pigment preparation containing (A) at least one organic and/or inorganic pigment, (B) a dispersant of formula (I), (II), (III) or (IV) or mixtures of the dispersants of formula (I), (II), (III) or (IV), (C) optionally wetting agents, (C) optionally other surfactants and/other dispersants, (E) optionally at least one organic solvent or at least one hydrotropic substance, (F) optionally other additives commonly used to produce aqueous pigment dispersions.

10 Claims, No Drawings

AQUEOUS PIGMENT PREPARATIONS COMPRISING ANIONIC ADDITIVES BASED ON ALLYL ETHER AND VINYL ETHER

The present invention provides aqueous pigment preparations comprising novel anionic polymers as dispersants and also their use for coloration of natural and synthetic materials.

Dispersing pigments in liquid media typically requires dispersants. Examples of where dispersants are of particular commercial importance are the dispersing of pigments in the manufacture of pigment concentrates (used for coloration of emulsion and varnish colors, paints, coatings and printing inks) and also the coloration of paper and paper pulp, cardboard and textiles.

Pigment preparations comprising ordered polymeric structures are also described in the prior art. Examples thereof are EP 1 293 523, DE 10 2005 012 315 and EP 1 721 941.

The formerly customary novolak dispersants contain as a consequence of their process of production residues of alkylphenols, frequently nonylphenol, and ethoxylates thereof. Since alkylphenol ethoxylates, or their degradation products, scarcely undergo any degradation in the environment, they build up. This is problematic in that they have a hormonal effect on aquatic organisms. Therefore, many countries have adopted legislation (2003/53/EC for example) which limits or bans the use of materials containing alkylphenols or their ethoxylates in open-loop systems.

Studies to date have shown that it is still extremely difficult to synthesize dispersants that are equivalent in performance to anionic novolak systems. There is accordingly a need for novel dispersants that are capable of dispersing organic pigments in high concentration above 40% to low-viscosity dispersions. These dispersions shall be straightforward to produce; i.e., the pigments shall be readily wetted and be readily incorporated into the aqueous medium. The dispersion shall have a high and reproducible color strength and this shall remain stable for a period of several years. Similarly, all further coloristic parameters such as, for example, hue angle and chroma shall be reproducible and stable. Furthermore, the dispersion shall have a low viscosity; the pigments must neither agglomerate nor flocculate, nor cream up or form a sediment. The dispersion should not foam or cause or speed foaming in the application medium. Furthermore, the dispersants should contribute to broad compatibility of the dispersions in various application media. Moreover, the dispersion shall be shear stable; i.e., its color strength or coloristics must not change under shearing, and the dispersion shall remain resistant to flocculation under these conditions.

It has now been found that, surprisingly, specific anionic copolymers, prepared by means of macromonomers composed of polyethylene/polypropylene glycol monovinyl ethers or monoallyl ethers, achieve this object.

The present invention provides aqueous pigment preparations comprising (A) at least one organic and/or inorganic pigment, (B) a dispersant of formula (I), (II), (III) or (IV) or mixtures of dispersants of formulae (I), (II), (III) or (IV)

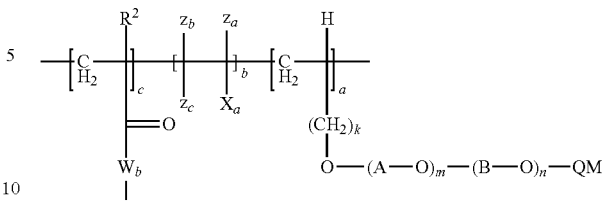

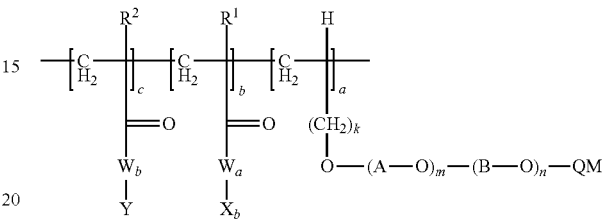

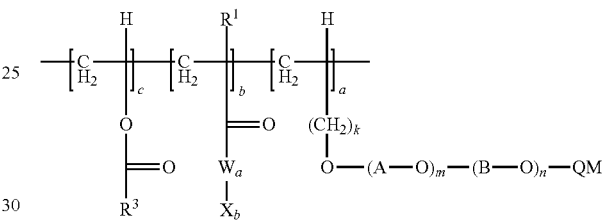

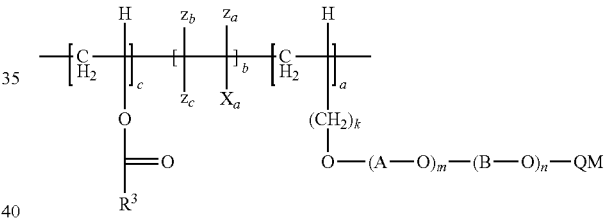

where the indices a, b and c indicate the molar fraction of the respective monomers:

a=0.01 to 0.8, preferably 0.1 to 0.7;
b=0.001 to 0.8, preferably 0.1 to 0.6;
c=0.001 to 0.8, preferably 0.1 to 0.6;
provided the sum total of a+b+c is 1,
A represents $C_2$- to $C_4$-alkylene and
B represents a $C_2$- to $C_4$-alkylene other than A,
k equals 0 or 1,
m is from 0 to 500, preferably from 0 to 50;
n is from 0 to 500, preferably from 0 to 50,
provided the sum total of m+n is from 1 to 1000;
$X_a$ represents an aromatic or araliphatic radical having 3 to 30 carbon atoms which optionally contains one or more of the hetero atoms N, O and S,
$Z_a$ represents H or ($C_1$-$C_4$)-alkyl,
$Z_b$ represents H or ($C_1$-$C_4$)-alkyl,
$Z_c$ represents H or ($C_1$-$C_4$)-alkyl;
$R^1$ represents hydrogen or methyl,
$X_b$ represents an aromatic or araliphatic radical having 3 to 30 carbon atoms which optionally contains one or more of the hetero atoms N, O and S,
$W_a$ represents oxygen or an NH group,
$R^2$ represents hydrogen or methyl,
Y represents an aliphatic hydrocarbyl radical having 1 to 30 carbon atoms, preferably 6 to 30, particularly 9 to 20 carbon atoms, which may be linear or branched or else cyclic, and which may contain hetero atoms O, N and/or S and may also be unsaturated, $W_b$ represents oxygen or an NH group;

Q represents $SO_3$, $CH_2COO$, $PO_3M$;

or QM represents:

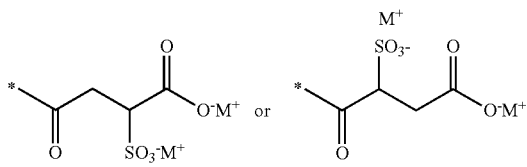

where

M represents H, a monovalent metal cation, a divalent metal cation, $NH_4^+$, a secondary, tertiary or quaternary ammonium ion, or a combination thereof, or represents equivalents of di-, tri- or polyvalent metal ions such as for example $Ca^{2+}$ or $Al^{3+}$ (the asterisk * in the Markush formula indicates that there is a link to the polymer at this site);

(C) optionally wetters,
(D) optionally further surfactants and/or dispersants,
(E) optionally one or more organic solvents and/or one or more hydrotropic substances,
(F) optionally further additive materials customary for preparing aqueous pigment dispersions, and
(G) water.

Preferred pigment preparations comprise 5% to 80% by weight, for example 10% to 70% by weight, of component (A).

Preferred pigments preparations comprise 0.1% to 30% by weight, for example 2% to 15% by weight of component (B).

Particularly preferred pigment preparations comprise in terms of component (A) 5% to 80% by weight, for example 10% to 70% by weight,
(B) 0.1% to 30% by weight, for example 2% to 15% by weight,
(C) 0% to 10% by weight, for example 0.1% to 5% by weight,
(D) 0% to 20% by weight, for example 1% to 10% by weight,
(E) 0% to 30% by weight, for example 5% to 20% by weight,
(F) 0% to 20% by weight, for example 0.1% to 5% by weight,
(G) 1% to 90% by weight of water, for example 10% to 70% by weight, all based on the total weight (100% by weight) of the pigment preparation.

When one or more of components (C), (D), (E) and (F) are present, their minimum concentrations independently of each other are preferably at least 0.01% by weight and more preferably at least 0.1% by weight, based on the total weight of the pigment preparation.

Component (A) in the pigment preparation of the present invention is a finely divided organic or inorganic pigment or a mixture of various organic and/or inorganic pigments. Component (A) can also be a dye that is soluble in certain solvents and has pigment character in other solvents. The pigments can be used not only in the form of dry powder but also as water-moist presscake.

Useful organic pigments include monoazo, disazo, laked azo, β-naphthol, Naphthol AS, benzimidazolone, disazo condensation, azo metal complex pigments and polycyclic pigments such as, for example, phthalocyanine, quinacridone, perylene, perinone, thioindigo, anthranthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

Of the organic pigments mentioned, those which are in a very fine state of subdivision for producing the preparations are particularly suitable, and preferably 95% and more preferably 99% of the pigment particles have a particle size ≦500 nm.

An exemplary selection of particularly preferred organic pigments includes carbon black pigments, for example lamp or furnace blacks; monoazo and disazo pigments, in particular the Colour Index pigments Pigment Yellow 1, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 81, Pigment Yellow 83, Pigment Yellow 87, Pigment Yellow 97, Pigment Yellow 111, Pigment Yellow 126, Pigment Yellow 127, Pigment Yellow 128, Pigment Yellow 155, Pigment Yellow 174, Pigment Yellow 176, Pigment Yellow 191, Pigment Yellow 213, Pigment Yellow 214, Pigment Yellow 219, Pigment Red 38, Pigment Red 144, Pigment Red 214, Pigment Red 242, Pigment Red 262, Pigment Red 266, Pigment Red 269, Pigment Red 274, Pigment Orange 13, Pigment Orange 34 or Pigment Brown 41; β-naphthol and Naphthol AS pigments, in particular the Colour Index pigments Pigment Red 2, Pigment Red 3, Pigment Red 4, Pigment Red 5, Pigment Red 9, Pigment Red 12, Pigment Red 14, Pigment Red 53:1, Pigment Red 112, Pigment Red 146, Pigment Red 147, Pigment Red 170, Pigment Red 184, Pigment Red 187, Pigment Red 188, Pigment Red 210, Pigment Red 247, Pigment Red 253, Pigment Red 256, Pigment Orange 5, Pigment Orange 38 or Pigment Brown 1; laked azo and metal complex pigments, in particular the Colour Index pigments Pigment Red 48:2, Pigment Red 48:3, Pigment Red 48:4, Pigment Red 57:1, Pigment Red 257, Pigment Orange 68 or Pigment Orange 70; benzimidazoline pigments, in particular the Colour Index pigments Pigment Yellow 120, Pigment Yellow 151, Pigment Yellow 154, Pigment Yellow 175, Pigment Yellow 180, Pigment Yellow 181, Pigment Yellow 194, Pigment Red 175, Pigment Red 176, Pigment Red 185, Pigment Red 208, Pigment Violet 32, Pigment Orange 36, Pigment Orange 62, Pigment Orange 72 or Pigment Brown 25; isoindolinone and isoindoline pigments, in particular the Colour Index pigments Pigment Yellow 139 or Pigment Yellow 173; phthalocyanine pigments, in particular the Colour Index pigments Pigment Blue 15, Pigment Blue 15:1, Pigment Blue 15:2, Pigment Blue 15:3, Pigment Blue 15:4, Pigment Blue 15:6, Pigment Blue 16, Pigment Green 7 or Pigment Green 36; anthanthrone, anthraquinone, quinacridone, dioxazine, indanthrone, perylene, perinone and thioindigo pigments, in particular the Colour Index pigments Pigment Yellow 196, Pigment Red 122, Pigment Red 149, Pigment Red 168, Pigment Red 177, Pigment Red 179, Pigment Red 181, Pigment Red 207, Pigment Red 209, Pigment Red 263, Pigment Blue 60, Pigment Violet 19, Pigment Violet 23 or Pigment Orange 43; triarylcarbonium pigments, in particular the Colour Index pigments Pigment Red 169, Pigment Blue 56 or Pigment Blue 61; diketopyrrolopyrrole pigments, in particular the Colour Index pigments Pigment Red 254, Pigment Red 255, Pigment Red 264, Pigment Red 270, Pigment Red 272, Pigment Orange 71, Pigment Orange 73, Pigment Orange 81. Laked dyes such as calcium, magnesium and aluminum lakes of sulfonated and/or carboxylated dyes are also suitable.

Suitable inorganic pigments include for example titanium dioxides, zinc sulfides, zinc oxides, iron oxides, magnetites, manganese iron oxides, chromium oxides, ultramarine, nickel or chromium antimony titanium oxides, manganese titanium rutiles, cobalt oxides, mixed oxides of cobalt and of aluminum, rutile mixed phase pigments, sulfides of the rare earths, spinels of cobalt with nickel and zinc, spinels based on iron and chromium with copper zinc and also manganese, bismuth vanadates and also blend pigments. The Colour Index pigments Pigment Yellow 184, Pigment Yellow 53, Pigment Yellow 42, Pigment Yellow Brown 24, Pigment Red 101, Pigment Blue 28, Pigment Blue 36, Pigment Green 50, Pigment Green 17, Pigment Black 11, Pigment Black 33 and also Pigment White 6 are used in particular. Preference is frequently also given to using mixtures of inorganic pigments. Mixtures of organic with inorganic pigments are likewise often used.

Instead of pigment dispersions it is also possible to prepare dispersions of solids including for example natural finely divided ores, minerals, sparingly soluble or insoluble salts, particles of wax or plastic, dyes, crop protection and pest control agents, UV absorbers, optical brighteners and polymerization stabilizers.

The copolymers (component B) have a molecular weight of $10^3$ g/mol to $10^9$ g/mol, more preferably of $10^3$ to $10^7$ g/mol and even more preferably $10^3$ to $10^5$ g/mol. These polymers may be prepared by conventional methods of free-radical polymerization of monomers corresponding to the radicals in formula (I), (II), (III) or (IV) which are described in the parentheses $[\ ]_c$, $[\ ]_b$ and $[\ ]_a$. Following the polymerization, the nonionic polymer thus obtained is converted to anionic functionalities.

Preferred monomers of group $[\ ]_a$ are those in which A is ethylene and B is propylene, or A is propylene and B is ethylene.

The alkylene oxide units $(A-O)_m$ and $(B-O)_n$ can be present either in a random arrangement or, as in the case of a preferred embodiment, in a blocklike arrangement.

The sum total of the alkylene oxide units can in principle be n+m=1 to 1000, although 1 to 500 is preferred, 2 to 100 is particularly preferred and 5 to 100 is even more particularly preferred.

The monomers of group $[\ ]_b$ include for example the following esters and amides of acrylic acid and methacrylic acid: phenyl, benzyl, tolyl, 2-phenoxyethyl, phenethyl.

Monomers of group $[\ ]_b$ further include vinylaromatic monomers such as styrene and its derivatives, such as vinyltoluene and α-methylstyrene for example. The aromatic unit may also comprise heteroaromatics, as in 1-vinylimidazole for example.

Particularly preferred monomers of group $[\ ]_b$ can be: styrene, 1-vinylimidazole, benzyl methacrylate, 2-phenoxyethyl methacrylate and phenethyl methacrylate.

The monomers of group $[\ ]_c$ include for example the following esters and amides of acrylic acid and methacrylic acid: methyl, ethyl, propyl, isopropyl, n-butyl, isobutyl, t-butyl, pentyl, hexyl, 2-ethylhexyl, 3,3-dimethylbutyl, heptyl, octyl, isooctyl, nonyl, lauryl, cetyl, stearyl, behenyl, cyclohexyl, trimethylcyclohexyl, t-butylcyclohexyl, bornyl, isobornyl, adamantyl, (2,2-dimethyl-1-methyl)propyl, cyclopentyl, 4-ethyl-cyclohexyl, 2-ethoxyethyl, tetrahydrofurfuryl and tetrahydropyranyl.

The monomers of group $[\ ]_c$ further include the vinyl esters of carboxylic acids, such as for example vinyl laurate, vinyl myristate, vinyl stearate, vinyl behenate, vinyl pivalate, vinyl neohexanoate, vinyl neoheptanoate, vinyl neooctanoate, vinyl neononanoate and vinyl neodecanoate. The vinyl esters of mixtures of such carboxylic acids can likewise be used here.

Preferred monomers of group $[\ ]_c$ are the following alkyl esters and alkylamides of acrylic acid and methacrylic acid: methyl, ethyl, propyl, butyl, isobutyl, 2-ethoxyethyl, myristyl, octadecyl, more preferably 2-ethylhexyl and lauryl.

Component (C) generally comprises cationic, anionic, amphoteric or nonionic compounds which enhance pigment wetting (wetting agents, wetters), for example, alkyl sulfates such as, for example, lauryl sulfate, alkylbenzene sulfonic acid, short-chain alkoxylation products such as, for example, lauryl alcohol reacted with approximately 5 mol of ethylene oxide or alkynediols.

Component (D) in the pigment preparations of the present invention comprises customary dispersants and surfactants useful for preparing aqueous pigment dispersions, or mixtures thereof. Anionic, cationic, amphoteric or nonionic surface-active compounds are typically used, as described in DE-A-10 2007 021 870.

Component (E) comprises organic solvents or water-soluble hydrotropic substances. Hydrotropic compounds, which also serve as a solvent, if appropriate, or are oligomeric or polymeric in nature are for example formamide, urea, tetra-methylurea, ε-caprolactam, ethylene glycol, propylene glycol, diethylene glycol, triethylene glycol, polyethylene glycol, α-methyl ω-hydroxy polyethylene glycol ether, dimethyl polyethylene glycol ether, dipropylene glycol, polypropylene glycol, dimethyl polypropylene glycol ether, copolymers of ethylene glycol and propylene glycol, butyl glycol, methylcellulose, glycerol, diglycerol, polyglycerol, N-methyl-pyrrolidone, 1,3-diethyl-2-imidazolidinone, thiodiglycol, sodium benzenesulfonate, sodium xylenesulfonate, sodium toluenesulfonate, sodium cumenesulfonate, sodium dodecylsulfonate, sodium benzoate, sodium salicylate, sodium butyl monoglycol sulfate, cellulose derivatives, gelatin derivatives, polyvinylpyrrolidone, polyvinyl alcohol, polyvinylimidazole and co- and terpolymers of vinylpyrrolidone, vinyl acetate and vinylimidazole. Polymers comprising vinyl acetate building blocks may subsequently be saponified to the vinyl alcohol.

Component (F) comprises for example thickeners, preservatives, viscosity stabilizers, grinding assistants and fillers. Further customary additives are antisettling agents, photoprotectants, antioxidants, degassers/defoamers, foam-reducing agents, anticaking agents and also viscosity and rheology improvers. Useful viscosity regulators include for example polyvinyl alcohol and cellulose derivatives. Water-soluble natural or manufactured resins and also polymers may similarly be included as filming or binding agents to enhance bonding strength and abrasion resistance. Useful pH regulators include organic or inorganic bases and acids. Preferred organic bases are amines, for example ethanolamine, diethanolamine, triethanolamine, N,N-dimethylethanolamine, diisopropylamine, aminomethylpropanol or dimethylaminomethylpropanol. Preferred inorganic bases are sodium hydroxide, potassium hydroxide, lithium hydroxide or ammonia. Component (F) may also comprise fats and oils of vegetable and animal origin, for example beef tallow, palm kernel fat, coconut fat, rapeseed oil, sunflower oil, linseed oil, palm oil, soy oil, groundnut oil and whale oil, cotton seed oil, maize oil, poppy seed oil, olive oil, castor oil, colza oil, safflower oil, soybean oil, thistle oil, sunflower oil, herring oil, sardine oil. Common additives also include saturated and unsaturated higher fatty acids, for example palmitic acid, cyprylic acid, capric acid, myristic acid, lauric acid, stearic acid, oleic acid, linoleic acid, linolenic acid, caproic acid, caprylic acid, arachidic acid, behenic acid, palmitoleic acid, gadoleic acid, erucic acid and ricinoleic acid, and also salts thereof.

Water used as component (G) to produce the pigment preparations is preferably used in the form of demineralized or distilled water. It is similarly possible to use drinking water (tap water) and/or water of natural origin.

The present invention also provides a process for producing the pigment preparations of the present invention, which process comprises dispersing said component (A) in the form of powder, granulate or aqueous presscake in the presence of water (G) and also said components (B) and optionally (C) and (D), then optionally admixing water (G) and also optionally one or more of said components (E) and (F) and optionally diluting the resulting aqueous pigment dispersion with water (G). Said components (B) and optionally one or more of said components (C), (D), (E) and (F) are preferably initially mixed and homogenized, then said component (A) is stirred into the initially charged mixture, said component (A) being incipiently pasted and predispersed. The predispersion is subsequently, depending on the texture of component (A), finely dispersed or finely dissipated, with or without cooling, using a grinding or dispersing assembly. Such may include stirrers, dissolvers (sawtooth stirrers), rotor-stator mills, ball mills, stirred media mills such as sand and bead mills, high speed mixers, kneaders, roll stands or high performance bead mills. The fine dispersing or grinding of component (A) is carried on to the desired particle size distribution and can take place at temperatures in the range from 0 to 100° C., advantageously at a temperature between 10 and 70° C., preferably at 20 to 60° C. Following the fine-dispersing operation, the pigment preparation may be further diluted with water (G), preferably deionized or distilled water.

The pigment preparations of the present invention are useful for pigmenting and dyeing natural and synthetic materials of any kind, particularly aqueous paints, emulsion and varnish colors (emulsion varnishes), for paper pulp dyeing and for laminate production and coloration.

The pigment preparations of the present invention are further useful for coloration of macromolecular materials of any kind, for example natural and synthetic fiber materials and preferably cellulose fibers. Further uses are the production of printing colors, for example textile printing colors, flexographic printing inks, decorative printing inks or intaglio printing inks, wallpaper colors, water-thinnable varnishes, wood preservation systems, viscose dope dyeing systems, varnishes, including powder coatings, sausage casings, seed, fertilizers, glass, particularly glass bottles, and also for mass coloration of roof shingles, in coloration for renders, concrete, wood stains, colored pencil leads, felt tip pens, waxes, paraffins, graphics inks, ballpoint pen pastes, chalks, washing and cleaning compositions, shoe care agents, latex products, abrasives, and also for coloration of plastics or high molecular weight materials of any kind. Examples of high molecular weight organic materials are cellulose ethers and esters, such as ethylcellulose, nitrocellulose, cellulose acetate or cellulose butyrate, natural resins or synthetic resins, such as addition polymerization resins or condensation resins, for example amino resins, particularly urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters; polyamides, polyurethanes or polyesters, rubber, casein, latices, silicone, silicone resins, individually or in admixture.

The pigment preparations of the present invention are further useful for producing printing inks for use in all conventional ink-jet printers, particularly for those based on the bubble jet or piezo process. These printing inks can be used to print paper and also natural or synthetic fiber materials, foils and plastics. Additionally, the pigment preparations of the present invention can be used for printing various kinds of coated or uncoated substrate materials, for example for printing paper board, cardboard, wood and woodbase materials, metallic materials, semiconductor materials, ceramic materials, glasses, glass and ceramic fibers, inorganic materials of construction, concrete, leather, comestibles, cosmetics, skin and hair. The substrate material may be two-dimensionally planar or spatially extended, i.e., three-dimensionally configured, and may be printed or coated completely or only in parts.

The pigment preparations of the present invention are also useful as a colorant in electrophotographic toners and developers, for example in one- or two-component powder toners (also called one- or two-component developers), magnet toners, liquid toners, latex toners, polymerization toners and also specialty toners.

The pigment preparations of the present invention are also useful as a colorant in liquid inks, preferably ink-jet inks, for example aqueous or nonaqueous (solvent based), microemulsion inks, UV-curable inks, and also in such inks that operate according to the hot melt process.

The pigment preparations of the present invention can also be used as colorants for color filters for flat panels displays, not only for additive but also for subtractive color production, also for photoresists and also as colorants for "electronic inks" or "e-inks" or "electronic paper" or "e-paper".

EXAMPLES

Preparation of Dispersants (B)
Synthesis Prescription 1:
General Prescription for Polymerization:

A flask equipped with stirrer, reflux condenser, internal thermometer and nitrogen inlet was initially charged with monomer A, monomer C and, where appropriate, the molecular weight regulator in solvent under nitrogen.

Then, the temperature was raised to 80° C. with stirring and a solution of the initiator was added during one hour by metering. At the same time, the metered addition was commenced of monomer B, and it was concluded after 3 hours. The batch was subsequently further stirred at this temperature for 2 hours, and then the solvent was removed under reduced pressure.

Synthesis Prescription 2:
General Prescription for Polymerization:

A flask equipped with stirrer, reflux condenser, internal thermometer and nitrogen inlet was initially charged with monomer A, monomer C and, where appropriate, the molecular weight regulator and component 1 (ascorbic acid) of the redox initiator system in solvent under nitrogen. Then, the temperature was raised to 80° C. with stirring and a solution of component 2 (t-BuOOH) of the redox initiator system was added during three hours by metering. At the same time the metered addition was commenced of monomer B, and it was concluded after 3 hours. The batch was subsequently further stirred at this temperature for 2 hours, and then the solvent was removed under reduced pressure.

Synthesis Prescription 3:
General Synthesis Prescription for Converting the Polymers Obtained According to Synthesis Prescription 1 or 2 to Anionic Copolymers Having Ether Sulfate Groups on the Side Chains:

The copolymer was initially charged with amidosulfonic acid and urea to a flask under nitrogen. Then, the initial charge was heated to 100° C. for 4 hours with stirring. Subsequently, pH 6.5 to 7.5 was set with 50% by weight aqueous sodium hydroxide solution. NMR spectroscopy verified a degree of conversion of >95% to the corresponding sulfuric ester ammonium salt.

Synthesis Prescription 4:
General Synthesis Prescription for Converting the Polymers Obtained According to Synthesis Prescription 1 or 2 to Anionic Copolymers Having Sulfosuccinate Groups on the Side Chains:

The copolymer was initially charged to a flask under nitrogen. Then, maleic anhydride and sodium hydroxide were added and the mixture was heated with stirring to a temperature of 75 to 85° C. At this temperature, the mixture was stirred for three hours and then admixed with aqueous sodium sulfite solution (10% strength by weight) by metered addition. The mixture was stirred at 60 to 70° C. to complete the reaction and finally adjusted to pH 7 with 50% by weight aqueous sodium hydroxide solution.

The following three tables contain two-stage synthesis examples wherein the polymer is first prepared according to synthesis prescription 1 or 2 and then the anionic derivative of the polymer is prepared according to synthesis prescription 3 or 4.

AMBN=2,2'-azobis(2-methylbutyronitrile).

TABLE 1

|  |  | 1 | 2 | 3 | 4 | 5 | 6 | 7 | 8 | 9 | 10 |
|---|---|---|---|---|---|---|---|---|---|---|---|
| Monomer C | 2-ethylhexyl methacrylate | 136.4 g | | | | | | | | | |
|  | lauryl methacrylate | | | 175.0 g | | | | | | | |
|  | stearyl methacrylate | | | | | 232.8 g | | | | | |
|  | isobornyl methacrylate | | | | | | | | 152.9 g | | |
|  | tetrahydrofurfuryl methacrylate | | | | | | | | | 117.1 g | |
|  | vinyl neononanoate | | | | 78.3 g | | | | | | 78.3 g |
|  | vinyl neodecanoate | | 84.3 g | | | | | | 84.3 g | | |
|  | vinyl neoundecanoate | | | | | | 90.3 g | | | | |
| Monomer B | 1-vinylimidazole | | | | | | 64.7 g | 64.7 g | | | |
|  | styrene | 71.6 g | 41.6 g | | 41.6 g | | | | | | 41.6 g |
|  | benzyl methacrylate | | | | | | 70.4 g | | 70.4 g | | |
|  | phenethyl methacrylate | | | 130.8 g | | | | | | | |
|  | 2-phenoxyethyl methacrylate | | | | | | | | | 141.8 g | |
| Monomer A | polyglycol 1 | | 300 g | | 300 g | | 300 g | | | | 300 g |
|  | polyglycol 2 | 378.4 g | | 378.4 g | | 378.4 g | | | 378.4 g | | |
|  | polyglycol 3 | | | | | | | 688 g | | | |
|  | polyglycol 4 | | | | | | | | | 3000 g | |
| Initiator | AMBN | 16.5 g | 13.4 g | | 13.4 g | 16.5 g | 13.4 g | 16.5 g | 13.4 g | | |
|  | dibenzoyl peroxide | | | 20.8 g | | | | | | | |
|  | ascorbic acid/t-BuOOH | | | | | | | | | 17.51 g/ 7.73 g | 17.51 g/ 7.73 g |
| Regulator | dodecanethiol | 16.5 g | | 16.5 g | | 16.5 g | | 16.5 g | | 16.5 g | 13.4 g |
|  | ethyl mercaptan | | | | 4.2 g | | | | | | |
| Solvent | methyl ethyl ketone | 660 g | 660 g | | | 660 g | | | 660 g | 660 g | 660 g |
|  | methyl isobutyl ketone | | | 660 g | 660 g | | | | | | |
|  | isopropanol | | | | | | 660 g | 660 g | | | |
|  | polymerization by synthesis prescription | 1 | 1 | 1 | 1 | 1 | 1 | 1 | 1 | 2 | 2 |
|  | $M_w$ of polymer obtained | 14000 | 18500 | 10300 | 9000 | 12800 | 17900 | 15400 | 26200 | 11000 | 8800 |
|  | derivatization of polymer by synthesis prescription | 3 | 3 | 4 | 4 | 3 | 4 | 3 | 3 | 4 | 4 |
|  | amidosulfonic acid | 32.7 g | 51.9 g | | | 32.7 g | | 49.1 g | 47.6 g | | |
|  | urea | 1.03 g | 1.63 g | | | 1.03 g | | 1.55 g | 1.50 g | | |
|  | maleic anhydride | | | 33.7 g | 53.5 g | | 53.5 g | | | 33.7 g | 53.5 g |
|  | NaOH | | | 1.10 g | 1.75 g | | 1.75 g | | | 1.10 g | 1.75 g |
|  | sodium sulfite solution (10% strength in water) | | | 433 g | 687 g | | 687 g | | | 433 g | 687 g |

TABLE 2

|  |  | 11 | 12 | 13 | 14 | 15 | 16 | 17 | 18 | 19 | 20 |
|---|---|---|---|---|---|---|---|---|---|---|---|
| Monomer C | 2-ethylhexyl methacrylate | 136.4 g | | | | | | | | | |
|  | lauryl methacrylate | | | 175.0 g | | | | | | | |
|  | stearyl methacrylate | | | | | 232.8 g | | | | | |
|  | isobornyl methacrylate | | | | | | | 152.9 g | | | |
|  | tetrahydrofurfuryl methacrylate | | | | | | | | | 117.1 g | |
|  | vinyl neononanoate | | | | 78.3 g | | | | | | 78.3 g |
|  | vinyl neodecanoate | | 84.3 g | | | | | | 84.3 g | | |
|  | vinyl neoundecanoate | | | | | | 90.3 g | | | | |
| Monomer B | 1-vinylimidazole | | | | | | 64.7 g | 64.7 g | | | |
|  | styrene | 71.6 g | 41.6 g | | 41.6 g | | | | | | 41.6 g |
|  | benzyl methacrylate | | | | | | 70.4 g | | 70.4 g | | |
|  | phenethyl methacrylate | | | 130.8 g | | | | | | | |
|  | 2-phenoxyethyl methacrylate | | | | | | | | | 141.8 g | |

TABLE 2-continued

| | | 11 | 12 | 13 | 14 | 15 | 16 | 17 | 18 | 19 | 20 |
|---|---|---|---|---|---|---|---|---|---|---|---|
| Monomer A | polyglycol 5 | | | | | | 210 g | | | | |
| | polyglycol 6 | | 300 g | | 300 g | | | | 300 g | | 300 g |
| | polyglycol 7 | 378.4 g | | 378.4 g | | 378.4 g | | 378.4 g | | 378.4 g | |
| Initiator | AMBN | 16.5 g | 13.4 g | | 13.4 g | 16.5 g | 13.4 g | | 13.4 g | | |
| | dibenzoyl peroxide | | | 20.8 g | | | | 20.8 g | | | |
| | ascorbic acid/t-BuOOH | | | | | | | | | 17.51 g/ | 17.51 g/ |
| | | | | | | | | | | 7.73 g | 7.73 g |
| Regulator | dodecanethiol | | 13.4 g | 16.5 g | | | 13.4 g | 16.5 g | | | 13.4 g |
| | ethyl mercaptan | | | | 4.2 g | | | | 4.2 g | | |
| Solvent | methyl ethyl ketone | 660 g | 660 g | | | 660 g | 660 g | | | 660 g | 660 g |
| | methyl isobutyl ketone | | | 660 g | 660 g | | | | | | |
| | isopropanol | | | | | | | 660 g | 660 g | | |
| | polymerization by synthesis prescription | 1 | 1 | 1 | 1 | 1 | 1 | 1 | 1 | 2 | 2 |
| | $M_w$ of polymer obtained | 16200 | 7500 | 6100 | 8200 | 14600 | 7000 | 15000 | 8900 | 14700 | 9200 |
| | derivatization of polymer by synthesis prescription | 4 | 4 | 4 | 3 | 3 | 4 | 4 | 3 | 3 | 3 |
| | amidosulfonic acid | | | | 57.1 g | 36.0 g | | | 57.1 g | 36.0 g | 57.1 g |
| | urea | | | | 1.80 g | 1.14 g | | | 1.80 g | 1.14 g | 1.80 g |
| | maleic anhydride | 37.1 g | 58.8 g | 37.1 g | | | 58.8 g | 37.1 g | | | |
| | NaOH | 1.21 g | 1.92 g | 1.21 g | | | 1.92 g | 1.21 g | | | |
| | sodium sulfite solution (10% strength in water) | 476 g | 756 g | 476 g | | | 756 g | 476 g | | | |

TABLE 3

| | | 21 | 22 | 23 | 24 | 25 | 26 | 27 | 28 | 29 | 30 |
|---|---|---|---|---|---|---|---|---|---|---|---|
| Monomer C | 2-ethylhexyl methacrylate | 136.4 g | | | | | | | | | |
| | lauryl methacrylate | | 175.0 g | | | | | | | | |
| | stearyl methacrylate | | | | | 232.8 g | | | | | |
| | isobornyl methacrylate | | | | | | | 152.9 g | | | |
| | tetrahydrofurfuryl methacrylate | | | | | | | | | 117.1 g | |
| | vinyl neononanoate | | | | 78.3 g | | | | | | |
| | vinyl neodecanoate | | 84.3 g | | | | | | 84.3 g | | 78.3 g |
| | vinyl neoundecanoate | | | | | | 90.3 g | | | | |
| Monomer B | 1-vinylimidazole | | | | | 64.7 g | | 64.7 g | | | |
| | styrene | 71.6 g | 41.6 g | | 41.6 g | | | | | | 41.6 g |
| | benzyl methacrylate | | | | | | 70.4 g | | 70.4 g | | |
| | phenethyl methacrylate | | | 130.8 g | | | | | | | |
| | 2-phenoxyethyl methacrylate | | | | | | | | | 141.8 g | |
| Monomer A | polyglycol 8 | | 300 g | | | 300 g | | | 300 g | | |
| | polyglycol 9 | 429 g | | | 429 g | | | | | 429 g | |
| | polyglycol 10 | | | 876 g | | | | 876 g | | | |
| | polyglycol 11 | | | | | | 1224 g | | | | 1224 g |
| Initiator | AMBN | 16.5 g | 13.4 g | | 13.4 g | 16.5 g | 13.4 g | | 13.4 g | | |
| | dibenzoyl peroxide | | | 20.8 g | | | | 20.8 g | | | |
| | ascorbic acid/t-BuOOH | | | | | | | | | 17.51 g/ | 17.51 g/ |
| | | | | | | | | | | 7.73 g | 7.73 g |
| Regulator | dodecanethiol | 16.5 g | 13.4 g | | | 16.5 g | | | | 16.5 g | |
| | ethyl mercaptan | | | | 4.2 g | | | | 4.2 g | | |
| Solvent | methyl ethyl ketone | 660 g | 660 g | | | 660 g | 660 g | | | | |
| | methyl isobutyl ketone | | | 660 g | 660 g | | | 660 g | 660 g | | |
| | isopropanol | | | | | | | | | 660 g | 660 g |
| | polymerization by synthesis prescription | 1 | 1 | 1 | 1 | 1 | 1 | 1 | 1 | 2 | 2 |
| | $M_w$ of polymer obtained | 8400 | 7900 | 13900 | 9000 | 8100 | 26200 | 15000 | 8600 | 8900 | 24800 |
| | derivatization of polymer by synthesis prescription | 3 | 4 | 4 | 3 | 3 | 4 | 3 | 3 | 4 | 4 |
| | amidosulfonic acid | 54.4 g | | | 54.4 g | 57.1 g | | 55.6 g | 57.1 g | | |
| | urea | 1.72 g | | | 1.72 g | 1.80 g | | 1.76 g | 1.80 g | | |
| | maleic anhydride | | 58.8 g | 57.3 g | | | 57.2 g | | | 56.1 g | 57.2 g |
| | NaOH | | 1.92 g | 1.87 g | | | 1.87 g | | | 1.83 g | 1.87 g |
| | sodium sulfite solution (10% strength in water) | | 756 g | 736 g | | | 734 g | | | 720 g | 734 g |

Monomer A of Tables 1 to 3:

Polyglycol 1 polyalkylene glycol monovinyl ether (formula (I), k=0, n=0, m=11.5; (A-O) is ($CH_2CH_2O$)), molar mass about 550 g/mol Polyglycol 2 polyalkylene glycol monovinyl ether (formula (I), k=0, n=0, m=24; (A-O) is ($CH_2CH_2O$)), molar mass about 1100 g/mol Polyglycol 3 polyalkylene glycol monovinyl ether (formula (I), k=0, n=0, m=44.5; (A-O) is ($CH_2CH_2O$)), molar mass about 2000 g/mol Polyglycol 4 polyalkylene glycol monovinyl ether (formula (I), k=0, n=0, m=135.4; (A-O) is ($CH_2CH_2O$)), molar mass about 6000 g/mol Polyglycol 5 polyalkylene glycol monoallyl ether (formula (I), k=1, n=0, m=6.6; (A-O) is ($CH_2CH_2O$)), molar mass about 350 g/mol Polyglycol 6 polyalkylene glycol monoallyl ether (formula (I), k=1, n=0, m=10; (A-O) is ($CH_2CH_2O$)), molar mass about 500 g/mol Polyglycol 7 polyalkylene glycol monoallyl ether (formula (I), k=1, n=0, m=21.4; (A-O) is ($CH_2CH_2O$)), molar mass about 1000 g/mol Polyglycol 8 polyalkylene glycol monoallyl ether (formula (I), k=1, ethylene oxide/propylene oxide 6:4 (random polymer), molar mass about 500 g/mol Polyglycol 9 polyalkylene glycol monoallyl ether (formula (I), k=1, ethylene oxide (B—O)/propylene oxide (A-O) 11:4 (block copolymer), molar mass about 750 g/mol Polyglycol 10 polyalkylene glycol monoallyl ether (formula (I), k=1, ethylene oxide (B—O)/propylene oxide (A-O) 20:10 (block copolymer), molar mass about 1500 g/mol Polyglycol 11 polyalkylene glycol monoallyl ether (formula (I), k=1, ethylene oxide/propylene oxide 20:20 (random polymer), molar mass about 2100 g/mol Production of a Pigment Preparation:

The pigment, in the form alternatively of powder, granulate or presscake, was pasted up in deionized water together with the dispersants and the other adjuvants and then homogenized and predispersed using a dissolver (for example from VMA-Getzmann GmbH, type AE3-M1) or some other suitable apparatus. Fine dispersion was subsequently effected using a bead mill (for example AE3-M1 from VMA-Getzmann) or else some other suitable dispersing assembly, with milling being carried out with siliquartzite beads or zirconium mixed oxide beads of size d=1 mm, accompanied by cooling, until the desired color strength and coloristics were obtained. Thereafter, the dispersion was adjusted with deionized water to the desired final pigment concentration, the grinding media separated off and the pigment preparation isolated.

Evaluation of a Pigment Preparation:

Color strength and hue were determined in accordance with DIN 55986. The rub-out test was carried out by applying the emulsion color, after mixing with the pigment dispersion, to a paint card. Subsequently, the applied coating was rubbed with the finger on the lower part of the paint card. Incompatibility was present if the rubbed area is then more strongly or brightly colored than the adjacent area not aftertreated (the rub-out test is described in DE 2 638 946). Color strength and compatibilities with the medium to be colored was determined using an emulsion color for exteriors (waterborne, 20% $TiO_2$).

The coloristics of a paper pulp coloration were also evaluated. To this end, a chemical pulp suspension was given a 10% coloration with the pigment preparation, used to produce a firm piece of paper by drying and pressing and thereafter used to determine color strength and hue.

Foamability was determined by continuously squirting the dispersions, after dilution to 2% with water, by means of a peristaltic pump into a glass cylinder at high flow velocity and evaluating the height of the resulting foam.

Shear stability of the pigment preparations was determined by flocculating the pigment particles of the dispersion in a chemical pulp suspension by means of cationic epichlorohydrin resins. Shearing was applied using a commercially available kitchen blender (Braun MX 32) set to a high speed of rotation. The pulp was subsequently converted into paper and the color strength of a sheared dispersion was compared versus an unsheared dispersion.

Viscosity was determined using a cone-and-plate viscometer (Roto Visco 1) from Haake at 20° C. (titanium cone: Ø 60 mm, 1°), the relationship between viscosity and shear rate in a range between 0 and 200 $s^{-1}$ being investigated. Viscosities were measured at a shear rate of 60 $s^{-1}$.

To evaluate the storage stability of the dispersions, viscosity was measured directly after production of the preparation and also after four weeks' storage at 50° C.

The pigment preparations described in the examples which follow were produced by the method described above wherein the following constituents were used in the stated amounts such that 100 parts of the respective pigment preparation are formed. Parts are by weight in the examples below. The following general recipe applies:

X parts of component (A), pigment

Y parts of component (B), dispersant as per formula (I), (II), (III) or (IV), the no. of the synthesis example is indicated in the table 1 part of component (C), stearyl alkoxylate (4 mol of ethylene oxide)

10 parts of component (E)

0.2 part of component (F), preservative balance component (G), water

The respective fractions of X and Y and component E are reported in the tables which follow. FS=color strength, comp.=component, P=pigment.

| Pigment preparation No. | Composition | Color strength in white dispersion | Rub-out test | Strength in paper | Color strength loss in shear test | Foaming in foam test | Flowability of dispersion | As-prepared viscosity | Storage stability |
|---|---|---|---|---|---|---|---|---|---|
| 1 | 50 parts P. Yellow 1 (comp. A); 10 parts comp. B from synthesis example 13; comp. E is ethylene glycol | 105% | no rub-out | 100% | 1% | no foaming | very good | 605 mPas | very good |
| 2 | 50 parts P. Red 3 (comp. A); 10 parts comp. B from synthesis example 28; comp. E is propylene glycol | 100% | minimal rub-out | 103% | 3% | no foaming | very good | 628 mPas | good |
| 3 | 50 parts P. Yellow 74 (comp. A); 9 parts comp. B from synthesis example 27; comp. E is glycerol | 102% | no rub-out | 104% | 5% | very minimal foaming | very good | 133 mPas | very good |
| 4 | 40 parts P. Red 188 (comp. A); 10.5 parts comp. B from synthesis example 14; comp. E is diethylene glycol | 98% | no rub-out | 100% | 2% | no foaming | good | 465 mPas | very good |
| 5 | 45 parts P. Orange 5 (comp. A); 12 parts comp. B from synthesis example 29; comp. E is glycerol | 105% | no rub-out | 105% | 0% | no foaming | very good | 802 mPas | good enough |
| 6 | 42 parts P. Red 170 (comp. A); 10 parts comp. B from synthesis example 6; comp. E is triethylene glycol | 95% | minimal rub-out | 102% | 1% | no foaming | very good | 490 mPas | very good |
| 7 | 38 parts P. Yellow 151 (comp. A); 10 parts comp. B from synthesis example 1; comp. E is diglycerol | 104% | no rub-out | 100% | 0% | minimal foaming | very good | 513 mPas | good |
| 8 | 70 parts P. Red 101 (comp. A); 5 parts comp. B from synthesis example 29; comp. E is urea | 95% | no rub-out | 97% | 4% | no foaming | very good | 1864 mPas | adequate |
| 9 | 40 parts P. Red 188 (comp. A); 12 parts comp. B from synthesis example 9; comp. E is ethylene glycol | 103% | no rub-out | 98% | 5% | minimal foaming | good | 518 mPas | good |
| 10 | 65 parts P. Blue 28 (comp. A); 5 parts comp. B from synthesis example 7; comp. E is ethylene glycol | 99% | no rub-out | 94% | 2% | no foaming | very good | 2461 mPas | very good |
| 11 | 48 parts P. Red 9 (comp. A); 7 parts comp. B from synthesis example 16; comp. E is ethylene glycol | 106% | slight rub-out | 102% | 0% | no foaming | very good | 793 mPas | very good |
| 12 | 45 parts P. Blue 15:1 (comp. A); 6 parts comp. B from synthesis example 30; comp. E is propylene glycol | 101% | no rub-out | 95% | 0% | no foaming | good | 861 mPas | good |
| 13 | 42 parts P. Red 12 (comp. A); 8 parts comp. B from synthesis example 19; comp. E is α-methyl-o-hydroxypolyethylene glycol ether | 104% | no rub-out | 99% | 2% | no foaming | very good | 169 mPas | very good |
| 14 | 50 parts P. Blue 15 (comp. A); 8 parts comp. B from synthesis example 16; comp. E is ethylene glycol | 100% | no rub-out | 102% | 1% | no foaming | very good | 678 mPas | good |
| 15 | 40 parts P. Yellow 83 (comp. A); 7 parts comp. B from synthesis example 22; comp. E is diethylene glycol | 106% | no rub-out | 103% | 5% | no foaming | very good | 595 mPas | very good |
| 16 | 47 parts P. Blue 15:3 (comp. A); 7.5 parts comp. B from synthesis example 12; comp. E is ethylene glycol | 101% | no rub-out | 105% | 3% | minimal foaming | very good | 437 mPas | good |
| 17 | 35 parts P. Violet 19 (comp. A); 7 parts comp. B from synthesis example 24; comp. E is ethylene glycol | 97% | minimal rub-out | 100% | 1% | no foaming | very good | 512 mPas | good |
| 18 | 36 parts P. Violet 23 (comp. A); 12 parts comp. B from synthesis example 23; comp. E is glycerol | 103% | no rub-out | 101% | 0% | no foaming | very good | 284 mPas | very good |

-continued

| Pigment preparation No. | Composition | Color strength in white dispersion | Rub-out test | Strength in paper | Color strength loss in shear test | Foaming in foam test | Flowability of dispersion | As-prepared viscosity | Storage stability |
|---|---|---|---|---|---|---|---|---|---|
| 19 | 45 parts P. Red 184 (comp. A); 8 parts comp. B from synthesis example 10; comp. E is diethylene glycol | 99% | no rub-out | 103% | 1% | no foaming | very good | 152 mPas | very good |
| 20 | 75 parts P. Green 17 (comp. A); 5 parts comp. B from synthesis example 12; comp. E is propylene glycol | 107% | no rub-out | 105% | 3% | no foaming | very good | 615 mPas | good |
| 21 | 65 parts P. White 6 (comp. A); 8 parts comp. B from synthesis example 1; comp. E is propylene glycol | 99% relative whitening power in black emulsion paint | no rub-out | — | — | no foaming | very good | 2144 mPas | good |
| 22 | 40 parts P. Orange 36 (comp. A); 8 parts comp. B from synthesis example 21; comp. E is ethylene glycol | 101% | no rub-out | 102% | 3% | no foaming | very good | 477 mPas | very good |
| 23 | 40 parts P. Black 7 (comp. A); 6 parts comp. B from synthesis example 2; comp. E is polyvinyl alcohol | 102% | no rub-out | 101% | 2% | no foaming | very good | 210 mPas | very good |
| 24 | 42 parts P. Brown 41 (comp. A); 9 parts comp. B from synthesis example 8; comp. E is ethylene glycol | 90% | slight rub-out | 97% | 6% | no foaming | very good | 591 mPas | good |
| 25 | 70 parts P. Green 50 (comp. A); 6 parts comp. B from synthesis example 20; comp. E is e-caprolactam | 103% | no rub-out | 104% | 1% | no foaming | good | 2018 mPas | good |
| 26 | 41 parts P. Violet 32 (comp. A); 7 parts comp. B from synthesis example 18; comp. E is polyvinyl alcohol | 100% | minimal rub-out | 106% | 3% | no foaming | good | 960 mPas | good |
| 27 | 65 parts P. Yellow 184 (comp. A); 8 parts comp. B from synthesis example 13; comp. E is diethylene glycol | 108% | no rub-out | 105% | 5% | no foaming | good | 1824 mPas | good |
| 28 | 45 parts P. Red 208 (comp. A); 10 parts comp. B from synthesis example 24; comp. E is ethylene glycol | 102% | minimal rub-out | 90% | 4% | no foaming | very good | 615 mPas | very good |
| 29 | 40 parts P. Yellow 154 (comp. A); 10 parts comp. B from synthesis example 25; comp. E is ethylene glycol | 107% | no rub-out | 108% | 4% | no foaming | very good | 236 mPas | very good |
| 30 | 40 parts P. Red 5 (comp. A); 8 parts comp. B from synthesis example 15; comp. E is ethylene glycol | 97% | pronounced rub-out | 92% | 6% | no foaming | good | 639 mPas | mediocre |
| 31 | 50 parts P. Red 112 (comp. A); 8 parts comp. B from synthesis example 26; comp. E is butyl glycol | 100% | no rub-out | 105% | 0% | no foaming | very good | 355 mPas | very good |
| 32 | 38 parts P. Red 122 (comp. A); 11 parts comp. B from synthesis example 16; comp. E is ethylene glycol | 99% | no rub-out | 103% | 1% | no foaming | very good | 571 mPas | good |
| 33 | 50 parts P. Red 254 (comp. A); 8 parts comp. B from synthesis example 3; comp. E is polyglycerol | 110% | no rub-out | 107% | 6% | no foaming | very good | 468 mPas | very good |
| 34 | 40 parts P. Red 168 (comp. A); 9 parts comp. B from synthesis example 5; comp. E is diethylene glycol | 100% | no rub-out | 101% | 1% | slight foaming | very good | 403 mPas | very good |
| 35 | 45 parts P. Green 7 (comp. A); 8 parts comp. B from synthesis example 30; comp. E is ethylene glycol | 96% | no rub-out | 102% | 3% | no foaming | very good | 569 mPas | very good |

-continued

| Pigment preparation No. | Composition | Color strength in white dispersion | Rub-out test | Strength in paper | Color strength loss in shear test | Foaming in foam test | Flowability of dispersion | As-prepared viscosity | Storage stability |
|---|---|---|---|---|---|---|---|---|---|
| 36 | 48 parts P. Yellow 97 (comp. A); 10 parts comp. B from synthesis example 20; comp. E is diglycerol | 103% | no rub-out | 95% | 4% | no foaming | very good | 480 mPas | good |
| 37 | 40 parts P. Brown 25 (comp. A); 8 parts comp. B from synthesis example 7; comp. E is ethylene glycol | 100% | minimal rub-out | 102% | 0% | no foaming | good | 662 mPas | good |
| 38 | 40 parts P. Black 11 (comp. A); 5 parts comp. B from synthesis example 16; comp. E is ethylene glycol | 93% | rub-out | 101% | 2% | no foaming | good | 1530 mPas | good |
| 39 | 72 parts P. White 18 (comp. A); 7.5 parts comp. B from synthesis example 5; comp. E is ethylene glycol | 103% relative whitening power in black emulsion paint | slight rub-out | — | — | no foaming | very good | 1750 mPas | very good |
| 40 | 50 parts P. Red 53:1 (comp. A); 7 parts comp. B from synthesis example 26; comp. E is ethylene glycol | 101% | no rub-out | 103% | 2% | no foaming | very good | 648 mPas | very good |
| 41 | 50 parts P. Red 266 (comp. A); 8.5 parts comp. B from synthesis example 20; comp. E is ethylene glycol | 106% | no rub-out | 100% | 7% | no foaming | very good | 415 mPas | very good |
| 42 | 40 parts P. Orange 13 (comp. A); 7 parts comp. B from synthesis example 17; comp. E is ethylene glycol | 96% | no rub-out | 105% | 3% | no foaming | good | 598 mPas | good enough |
| 43 | 40 parts P. Red 210 (comp. A); 10 parts comp. B from synthesis example 4; comp. E is triethylene glycol | 103% | no rub-out | 102% | 0% | slight foaming | very good | 608 mPas | very good |
| 44 | 40 parts P. Yellow 14 (comp. A); 8 parts comp. B from synthesis example 11; comp. E is glycerol | 99% | no rub-out | 94% | 5% | no foaming | very good | 164 mPas | very good |

What is claimed:

1. An aqueous pigment preparation comprising
(A) at least one organic pigment, an inorganic pigment or a combination thereof,
(B) a dispersant of formula (I), (II), (III) or (IV) or mixtures of dispersants of formulae (I), (II), (III) or (IV)

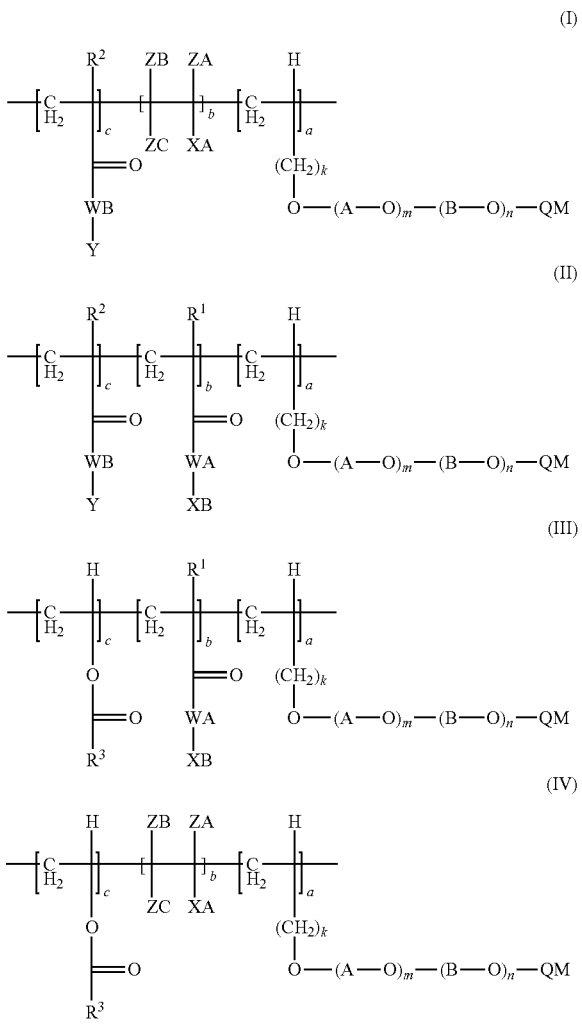

wherein the indices a, b and c are the molar fraction of the respective monomers:
a=0.01 to 0.8;
b=0.001 to 0.8;
c=0.001 to 0.8;
provided the sum total of a+b+c is 1,
A is $C_2$— to $C_4$-alkylene and
B is a $C_2$— to $C_4$-alkylene other than A,
k equals 0 or 1,
m is from 0 to 500;
n is from 0 to 500,
provided the sum total of m+n is from 1 to 1000;
XA represents an aromatic or araliphatic radical having 3 to 30 carbon atoms optionally containing one or more of the hetero atoms N, O and S,
ZA is H or $(C_1-C_4)$-alkyl,
ZB is H or $(C_1-C_4)$-alkyl,
ZC is H or $(C_1-C_4)$-alkyl;
$R^1$ is hydrogen or methyl,
XB is an aromatic or araliphatic radical having 3 to 30 carbon atoms optionally containing one or more of the hetero atoms N, O and S,
WA is oxygen or an NH group,
$R^2$ is hydrogen or methyl,
Y is an aliphatic hydrocarbyl radical having 1 to 30 carbon atoms, which are linear or branched or else cyclic, and optionally contains hetero atoms O, N, S and may also be unsaturated,
WB is oxygen or an NH group;
Q is $SO_3$, $CH_2COO$, $PO_3M$;
or QM is:

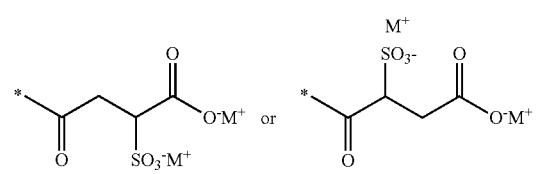

wherein
M is H, a monovalent metal cation, a divalent metal cation, $NH_4^+$, a secondary, tertiary or quaternary ammonium ion, or a combination thereof, or are equivalents of di-, tri- or polyvalent metal ions;
(C) optionally wetters,
(D) optionally further surfactants, dispersants or a combination thereof,
(E) optionally one or more organic solvents, or one or more hydrotropic substances or a combination thereof,
(F) optionally additive materials for preparing aqueous pigment dispersions, and
(G) water; and wherein
the asterisk in the formula QM represents a free valency and indicates the linkage to the group (B—O)n.

2. The pigment preparation as claimed in claim 1, comprising 5% to 80% by weight of said component (A).

3. The pigment preparation as claimed in claim 1, comprising 0.1% to 30% by weight of said component (B).

4. The pigment preparation as claimed in claim 1, having the following composition of said components (A) to (G):
(A) 5% to 80% by weight,
(B) 0.1% to 30% by weight,
(C) 0% to 10% by weight,
(D) 0% to 20% by weight,
(E) 0% to 30% by weight,
(F) 0% to 20% by weight,
(G) 1% to 90% by weight of water,
all based on the total weight of said pigment preparation.

5. The pigment preparation as claimed in claim 1, having the following composition of said components (A) to (G):
(A) 10% to 70% by weight,
(B) 2% to 15% by weight,
(C) 0.1% to 5% by weight,
(D) 1% to 10% by weight,
(E) 5% to 20% by weight,
(F) 0.1% to 5% by weight,
(G) 10% to 70% by weight of water,
all based on the total weight of said pigment preparation.

6. The pigment preparation as claimed in claim 1, wherein the organic pigment of said component (A) is a monoazo, disazo, laked azo, β-naphthol, Naphthol AS, benzimidazolone, disazo condensation, azo metal complex pigment or a polycyclic pigment selected from the group consisting of phthalocyanine, quinacridone, perylene, perinone, thioindigo, anthanthrone, anthraquinone, flavanthrone, indanthrone, isoviolanthrone, pyranthrone, dioxazine, quinophthalone, isoindolinone, isoindoline and diketopyrrolopyrrole pigments or carbon blacks.

7. The pigment preparation as claimed in claim 1, wherein the alkylene oxide units (A-O)$_m$ and (B—O)$_n$ are arranged in blocks in said component (B).

8. A process for producing a pigment preparation as claimed in claim 1, comprising the steps of dispersing said component (A) in the form of powder, granulate or aqueous presscake in the presence of water (G) and also said components (B) and optionally (C) and (D), optionally admixing water (G) and optionally one or more of said components (E) and (F) and optionally diluting the resulting aqueous pigment dispersion with water (G);

or said components (B) being precharged into a mixture and optionally one or more of said components (C), (D), (E) and (F) being initially mixed and homogenized, stirring said component (A) into the precharged mixture, said component (A) being incipiently pasted and predispersed.

9. A composition pigmented by a pigment preparation as claimed in claim 1, wherein the composition is selected from the group consisting of aqueous paints, emulsion colors varnish colors, water-thinnable varnishes, wallpaper colors, printing colors, colored paper pulp, cardboard and textiles.

10. A pigmented composition pigmented by a pigment preparation as claimed in claim 1, wherein the pigmented composition is selected from the group consisting of natural fiber materials, synthetic fiber materials, cellulose fibers, laminate coloration, printing inks, ink-jet inks, electrophotographic toners, powder coatings, color filters, electronic inks, electronic paper, color filters, wood preservation systems, viscose dope dyeing, sausage casings, seed, fertilizers, glass bottles, colored roof shingles, in coloration renders, concrete, wood stains, colored pencil leads, felt tip pens, waxes, paraffins, graphics inks, ballpoint pen pastes, chalks, washing and cleaning compositions, shoe care agents, latex products, abrasives, plastics coloration.

* * * * *